(12) United States Patent
Suh et al.

(10) Patent No.: US 8,009,832 B2
(45) Date of Patent: Aug. 30, 2011

(54) METHOD OF MANAGING COPY PROTECTION INFORMATION OF A RECORDING MEDIUM, RECORDING MEDIUM WITH COPY PROTECTION INFORMATION FOR CONTENTS RECORDED THEREON, AND REPRODUCING METHOD FOR THE RECORDING MEDIUM

(75) Inventors: Sang Woon Suh, Seoul (KR); Jin Yong Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1287 days.

(21) Appl. No.: 11/357,059

(22) Filed: Feb. 21, 2006

(65) Prior Publication Data

US 2006/0143480 A1 Jun. 29, 2006

Related U.S. Application Data

(62) Division of application No. 10/516,910, filed as application No. PCT/KR2004/000113 on Jan. 24, 2004.

(30) Foreign Application Priority Data

Jan. 24, 2003 (KR) .................. 10-2003-0004930

(51) Int. Cl.
*G06F 12/14* (2006.01)
*G11B 5/86* (2006.01)
*G11B 7/24* (2006.01)

(52) U.S. Cl. .......... 380/201; 380/44; 380/203; 713/165; 713/176; 713/193; 369/47.12; 369/47.13; 369/53.21; 369/275.3

(58) Field of Classification Search ................. None
See application file for complete search history.

(56) References Cited

U.S. PATENT DOCUMENTS

| | | | |
|---|---|---|---|
| 4,879,707 A | 11/1989 | Getreuer et al. | |
| 5,295,127 A | 3/1994 | Verboom et al. | |
| 5,572,507 A | 11/1996 | Ozaki et al. | |
| 5,596,639 A | 1/1997 | Kikinis | |
| 5,689,486 A | 11/1997 | Shimizu et al. | |
| 5,706,268 A | 1/1998 | Horimai | |
| 5,737,286 A * | 4/1998 | Timmermans et al. | 369/44.13 |
| 5,799,501 A | 9/1998 | Leonard et al. | |
| 5,802,174 A * | 9/1998 | Sako et al. | 380/201 |
| 5,809,006 A | 9/1998 | Davis et al. | |

(Continued)

FOREIGN PATENT DOCUMENTS

CN 1152170 6/1997

(Continued)

OTHER PUBLICATIONS

Office Action issued Feb. 27, 2009 by the USPTO in U.S. Appl. No. 10/762,535.

(Continued)

*Primary Examiner* — Kaveh Abrishamkar

(74) *Attorney, Agent, or Firm* — Harness, Dickey & Pierce, P.L.C.

(57) ABSTRACT

The present invention relates to a method of managing CPI (Copy Protection Information) for preventing unauthorized copy of encrypted content recorded on a high-density recording medium such as a BD-ROM (Blu-ray Disc ROM). In the present method, when main content data is recorded in encrypted manner, CPI that is necessary to decrypt the encrypted main content data is written in a predetermined PIC area and is also copied at least once in an area other than the PIC area.

16 Claims, 6 Drawing Sheets

U.S. PATENT DOCUMENTS

| | | | |
|---|---|---|---|
| 5,818,805 A | 10/1998 | Kobayashi et al. | |
| 5,848,050 A | 12/1998 | Nagasawa et al. | |
| 5,878,007 A | 3/1999 | Matsumoto et al. | |
| 5,892,797 A | 4/1999 | Deng | |
| 5,894,463 A | 4/1999 | Okawa et al. | |
| 6,021,199 A | 2/2000 | Ishibashi | |
| 6,031,815 A | 2/2000 | Heemskerk et al. | |
| 6,072,758 A | 6/2000 | Tajiri | |
| 6,128,388 A * | 10/2000 | Gotoh et al. | 380/59 |
| 6,150,888 A * | 11/2000 | Nakazawa | 331/11 |
| 6,215,759 B1 | 4/2001 | Tanoue et al. | |
| 6,223,247 B1 | 4/2001 | Otsuka et al. | |
| 6,223,285 B1 | 4/2001 | Komuro et al. | |
| 6,289,102 B1 * | 9/2001 | Ueda et al. | 380/201 |
| 6,353,890 B1 | 3/2002 | Newman | |
| 6,407,976 B2 | 6/2002 | Nagara et al. | |
| 6,516,064 B1 | 2/2003 | Osawa et al. | |
| 6,519,213 B1 | 2/2003 | Song et al. | |
| 6,538,982 B1 | 3/2003 | Van Vlerken et al. | |
| 6,549,495 B1 | 4/2003 | Spruit et al. | |
| 6,550,009 B1 | 4/2003 | Uranaka et al. | |
| 6,664,526 B2 | 12/2003 | Yokoi | |
| 6,665,240 B1 | 12/2003 | Kobayashi et al. | |
| 6,694,023 B1 | 2/2004 | Kim | |
| 6,708,299 B1 | 3/2004 | Xie | |
| 6,738,342 B2 | 5/2004 | Furumiya et al. | |
| 6,847,604 B2 * | 1/2005 | Ueki | 369/275.4 |
| 6,885,629 B2 | 4/2005 | Oshima et al. | |
| 6,930,977 B1 | 8/2005 | Kondo et al. | |
| 6,938,162 B1 | 8/2005 | Nagai et al. | |
| 7,006,416 B1 | 2/2006 | Ohgake | |
| 7,142,494 B2 * | 11/2006 | Sako et al. | 369/53.21 |
| 7,248,558 B2 * | 7/2007 | Kobayashi et al. | 369/275.4 |
| 7,266,074 B2 | 9/2007 | Kim et al. | |
| 7,400,725 B1 | 7/2008 | Yumiba et al. | |
| 2001/0010666 A1 | 8/2001 | Miyamoto et al. | |
| 2001/0036132 A1 | 11/2001 | Kobayashi et al. | |
| 2001/0046193 A1 | 11/2001 | Akiyama et al. | |
| 2002/0024914 A1 | 2/2002 | Kobayashi | |
| 2002/0031079 A1 | 3/2002 | Kato | |
| 2002/0041686 A1 | 4/2002 | Moriyama et al. | |
| 2002/0048241 A1 | 4/2002 | Kumagai et al. | |
| 2002/0048246 A1 | 4/2002 | Yamaguchi et al. | |
| 2002/0076047 A1 | 6/2002 | Ando et al. | |
| 2002/0080960 A1 | 6/2002 | Kanayama et al. | |
| 2002/0089920 A1 | 7/2002 | Gotoh et al. | |
| 2002/0097871 A1 | 7/2002 | Gotoh et al. | |
| 2002/0114027 A1 | 8/2002 | Horimai | |
| 2002/0144114 A1 | 10/2002 | Barnard et al. | |
| 2002/0181358 A1 | 12/2002 | Sako | |
| 2003/0007432 A1 | 1/2003 | Minamino et al. | |
| 2003/0012375 A1 | 1/2003 | Sako et al. | |
| 2003/0048725 A1 | 3/2003 | Lee et al. | |
| 2003/0053404 A1 | 3/2003 | Kondo | |
| 2003/0117920 A1 | 6/2003 | Sako et al. | |
| 2003/0174605 A1 | 9/2003 | Sako et al. | |
| 2003/0185128 A1 | 10/2003 | Shoji et al. | |
| 2004/0076110 A1 | 4/2004 | Hino et al. | |
| 2004/0100888 A1 | 5/2004 | Kanda et al. | |
| 2004/0120247 A1 | 6/2004 | Lee et al. | |
| 2004/0151091 A1 | 8/2004 | Ma et al. | |
| 2005/0018555 A1 | 1/2005 | Sabi et al. | |
| 2005/0099916 A1 | 5/2005 | Jeon et al. | |
| 2005/0122889 A1 | 6/2005 | Kobayashi et al. | |

FOREIGN PATENT DOCUMENTS

| | | |
|---|---|---|
| CN | 1293810 | 5/2001 |
| CN | 1362707 | 8/2002 |
| EP | 0 299 573 A1 | 7/1988 |
| EP | 0 545 472 B1 | 6/1993 |
| EP | 0 723 216 A2 | 7/1996 |
| EP | 0756279 | 1/1997 |
| EP | 0 898 271 A2 | 2/1999 |
| EP | 0 936 610 A2 | 8/1999 |
| EP | 0 997 899 A2 | 5/2000 |
| EP | 1 058 254 B1 | 12/2000 |
| EP | 1 067 540 A2 | 1/2001 |
| EP | 0 807 929 B1 | 2/2001 |
| EP | 1 122 729 A1 | 8/2001 |
| EP | 1 152 412 A1 | 11/2001 |
| EP | 1 168 312 A1 | 1/2002 |
| EP | 1 168 328 A1 | 1/2002 |
| EP | 1 229 537 A2 | 8/2002 |
| EP | 1 028 423 B1 | 3/2004 |
| JP | 05-036194 | 2/1993 |
| JP | 05-325193 | 12/1993 |
| JP | 07-272282 | 10/1995 |
| JP | 08-124171 | 5/1996 |
| JP | 08-147704 | 6/1996 |
| JP | 09-081938 | 3/1997 |
| JP | 09-128874 | 5/1997 |
| JP | 10-003746 | 1/1998 |
| JP | 10-172149 | 6/1998 |
| JP | 10-269577 | 10/1998 |
| JP | 11-066739 A | 3/1999 |
| JP | 11-086436 | 3/1999 |
| JP | 11-261950 | 9/1999 |
| JP | 11-306648 | 11/1999 |
| JP | 11-317002 | 11/1999 |
| JP | 2000-113452 | 4/2000 |
| JP | 2000-149415 | 5/2000 |
| JP | 2000-195049 | 7/2000 |
| JP | 2000-195094 | 7/2000 |
| JP | 2000-231722 | 8/2000 |
| JP | 2000-298941 | 10/2000 |
| JP | 2001-135021 A | 5/2001 |
| JP | 2001-167517 | 6/2001 |
| JP | 2001-189051 | 7/2001 |
| JP | 2001-243355 | 9/2001 |
| JP | 2001-256678 | 9/2001 |
| JP | 2001-332031 | 11/2001 |
| JP | 2001-344765 A | 12/2001 |
| JP | 2002-042347 | 2/2002 |
| JP | 2002-124034 | 4/2002 |
| JP | 2002-163857 | 6/2002 |
| JP | 2002-190159 | 7/2002 |
| JP | 2002-197674 | 7/2002 |
| JP | 2002-197789 | 7/2002 |
| JP | 2002-203374 A | 7/2002 |
| JP | 2002203369 | 7/2002 |
| JP | 2002-216360 | 8/2002 |
| JP | 2002-304809 | 10/2002 |
| JP | 2002-311976 A | 10/2002 |
| JP | 2002-319245 | 10/2002 |
| JP | 2002-367281 | 12/2002 |
| JP | 2003-006997 | 1/2003 |
| KR | 2001-0051834 A | 6/2001 |
| KR | 10-2004-0048476 | 6/2004 |
| TW | 357346 | 5/1999 |
| TW | 368649 | 9/1999 |
| TW | 408290 | 10/2000 |
| TW | 449737 | 8/2001 |
| TW | 501131 | 9/2002 |
| TW | 512316 | 12/2002 |
| TW | 512328 | 12/2002 |
| TW | 514895 | 12/2002 |
| WO | WO 97/45836 | 12/1997 |
| WO | WO 00/21085 | 4/2000 |
| WO | WO 01/03136 | 1/2001 |
| WO | WO 01/52250 | 7/2001 |
| WO | WO 01/88917 | 11/2001 |
| WO | WO 02/15183 A2 | 2/2002 |
| WO | WO 02/31821 A1 | 4/2002 |
| WO | WO 02/37493 A1 | 5/2002 |
| WO | WO 03/003358 | 1/2003 |
| WO | WO 2004/066286 A1 | 8/2004 |
| WO | WO 2004/095439 A1 | 11/2004 |

OTHER PUBLICATIONS

Office Action issued Feb. 26, 2009 by the USPTO in U.S. Appl. No. 10/516,910.

Supplementary European Search Report issued Nov. 10, 2006 in related European Patent Application No. EP 04 70 5015.

Inquiry issued Jan. 30, 2007 by Rospatent in Russian Patent Application No. 2006109209/28(010015).

Office Action issued Jun. 16, 2009 by the Japanese Patent Office in Japanese Patent Application No. 2006-500637.
Office Action issued Jul. 21, 2009 by the Japanese Patent Office in Japanese Application No. 2006-500631.
Office Action issued Jul. 14, 2009 by the Japanese Patent Office in Japanese Application No. 2008-319384.
Office Action issued Jul. 18, 2009 by the Korean Patent Office in Korean Application No. 10-2003-0005211.
European Office Action dated Dec. 14, 2009 for corresponding Application No. 06 001 614.4-2223.
Japanese Office Action dated Dec. 15, 2009 for corresponding Application No. 2008-319384.
Japanese Office Action dated Jan. 12, 2010 for corresponding Application No. 2007-243684.
Taiwanese Office Action issued in corresponding Taiwan Application No. 093101544 on Aug. 5, 2010 with English language translation.
Office Action dated Feb. 3, 2011 issued in corresponding U.S. Appl. No. 10/516,910.
Taiwanese Office Action dated Jan. 4, 2011 issued in corresponding Taiwanese Application No. TW 93101547.
Japanese Office Action dated Mar. 8, 2011 issued in corresponding Japanese Application No. JP 2006-500635.
Taiwanese Office Action dated Jun. 17, 2010 for corresponding Application No. 093101547 with English language translation.
U.S. Office Action dated Jul. 13, 2010 for corresponding U.S. Appl. No. 10/516,910.
Japanese Office Action dated Mar. 2, 2010.
U.S. Office Action for corresponding U.S. Appl. No. 11/367,599 dated Feb. 16, 2010.
Taiwanese Office Action dated Jan. 24, 2010 for corresponding Application No. 095114984 with English language translation.
U.S. Office Action dated Mar. 24, 2011 issued in corresponding U.S. Appl. No. 11/367,305.
Office Action issued Dec. 19, 2008 by the Chinese Patent Office in Chinese Patent Application No. 200480000399.8 (with English language translation).
Office Action issued Jul. 4, 2008 by the Chinese Patent Office in Chinese Patent Application No. 200610059757.3 (with English language translation).
Office Action issued Sep. 1, 2006 by the Chinese Patent Office in Chinese Patent Application No. 200480000399.8 (with English language translation).
Supplemental Search Report issued Apr. 2, 2008 by the European Patent Office in European Patent Application No. 04703277.6-2223.
Extended Search Report issued Mar. 26, 2008 by the European Patent Office in European Patent Application No. 07018405.6-2223.
Office Action issued Mar. 12, 2008 by the European Patent Office in European Patent Application No. 04703529.0-1232.
Extended Search Report issued Nov. 7, 2007 by the European Patent Office in European Patent Application No. 07018289.4-1232.
Office Action issued Oct. 29, 2007 by the European Patent Office in European Patent Application No. 06001616.9-1232.
Supplemental Search Report Issued Nov. 24, 2006 by the European Patent Office in European Patent Application No. 04705015.8-2223.
Extended Search Report issued Sep. 22, 2006 by the European Patent Office in European Patent Application No. 06001615.1-2223.
Supplemental Search Report issued Sep. 22, 2006 by the European Patent Office in European Patent Application No. 04703531.6-2223.
Supplemental Search Report issued Jun. 12, 2006 by the European Patent Office in European Patent Application No. 04703541.5-2210.
Office Action issued Aug. 20, 2008 by the Japanese Patent Office in Japanese Patent Application No. 2006-076406.
Office Action issued Aug. 19, 2008 by the Japanese Patent Office in Japanese Patent Application No. 2006-500635.
Office Action issued Mar. 24, 2008 by the Japanese Patent Office in Japanese Patent Application No. 2006-500637.
Office Action issued Mar. 17, 2008 by the Japanese Patent Office in Japanese Patent Application No. 2006-500638.
Office Action issued Jan. 16, 2008 by the Japanese Patent Office in Japanese Patent Application No. 2006-500639.
Office Action issued Jan. 16, 2008 by the Japanese Patent Office in Japanese Patent Application No. 2006-500635.
Office Action issued Jan. 16, 2008 by the Japanese Patent Office in Japanese Patent Application No. 2006-076406.
Office Action issued Jan. 16, 2008 by the Japanese Patent Office in Japanese Patent Application No. 2006-076383.
Office Action issued Aug. 24, 2007 by the Japanese Patent Office in Japanese Patent Application No. 2006-500638.
Office Action issued Mar. 30, 2006 by the Korean Patent Office in Korean Patent Application No. 10-2003-0004487.
Office Action issued Mar. 28, 2005 by the Korean Patent Office in Korean Patent Application No. 10-2003-0004487.
Office Action issued Jan. 30, 2007 by the Russian Patent Office in Russian Patent Application No. 2006109209/28 (with English language translation).
Office Action issued Jul. 10, 2007 by the Taiwanese Patent Office in Taiwanese Patent Application No. 095113498 (with English language translation).
Office Action issued Nov. 14, 2008 by the USPTO in U.S. Appl. No. 10/762,536.
Office Action issued Jul. 31, 2008 by the USPTO in U.S. Appl. No. 11/898,040.
Office Action issued Jun. 6, 2008 by the USPTO in U.S. Appl. No. 10/762,535.
Office Action issued Nov. 19, 2007 by the USPTO in U.S. Appl. No. 10/762,536.
Office Action issued Nov. 15, 2007 by the USPTO in U.S. Appl. No. 10/762,535.
Office Action issued Oct. 9, 2007 by the USPTO in U.S. Appl. No. 10/762,516.
Office Action issued Jun. 12, 2007 by the USPTO in U.S. Appl. No. 10/762,536.
Office Action issued Apr. 17, 2007 by the USPTO in U.S. Appl. No. 10/762,538.
Office Action issued Apr. 11, 2007 by the USPTO in U.S. Appl. No. 10/762,535.
International Search Report issued May 18, 2004 in International Patent Application No. PCT/KR2004/000111.
International Search Report issued May 18, 2004 in International Patent Application No. PCT/KR2004/000109.
International Search Report issued May 6, 2004 in International Patent Application No. PCT/KR2004/000113.
International Search Report issued Apr. 28, 2004 in International Patent Application No. PCT/KR2004/000081.
Japanese Office Action dated May 24, 2011 issued in corresponding Japanese Application No. JP 2006-76406.

* cited by examiner

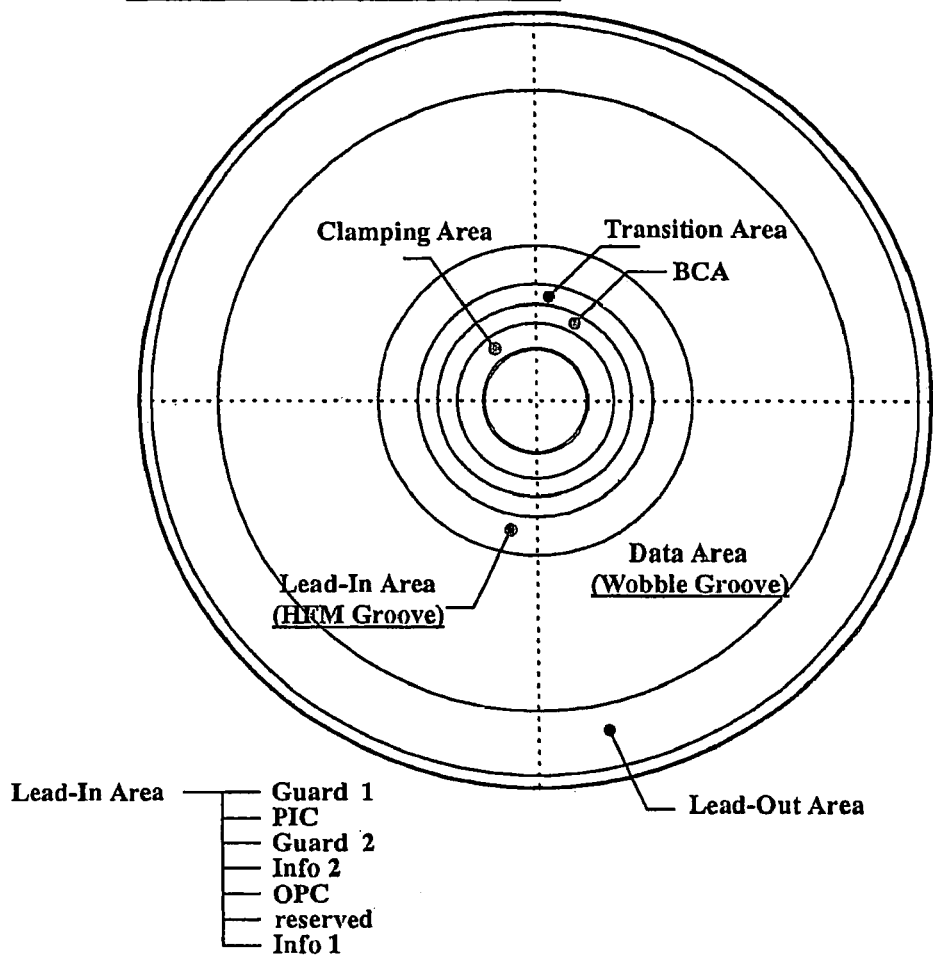
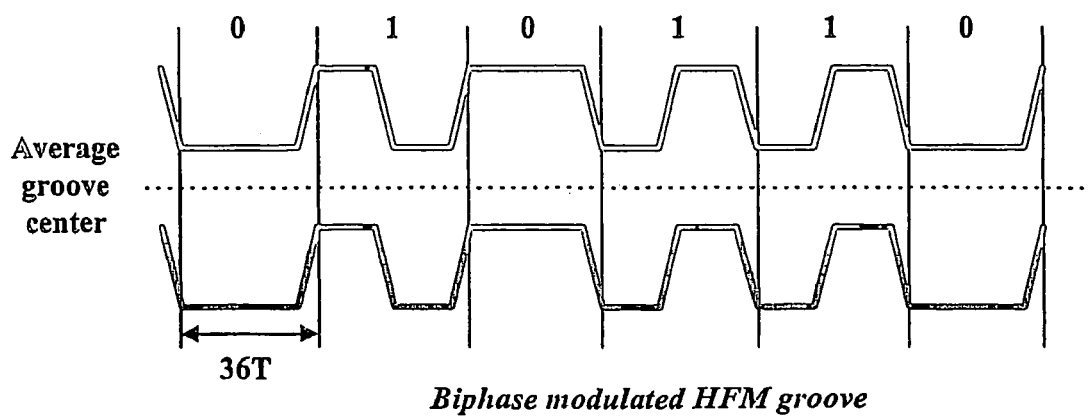

FIG. 6

| Byte number | Contents | number of bytes |
|---|---|---|
| 0 | Disc Information identifier = "DI" | 2 |
| 2 | DI format | 1 |
| 3 | Reserved = 00h | 1 |
| 4 | Number of DI frames in each DI Block | 1 |
| 5 | DI Frame sequence number in DI Block | 1 |
| 6 | Number of DI bytes in use in this DI Frame | 1 |
| 7 | Reserved = 00h | 1 |
| 8 to 10 | disc type identifier = "BDO" | 3 |
| 11 | disc size / version | 1 |
| 12 | disc structure | 1 |
| 13 | channel bit length | 1 |
| 14 to 15 | Reserved = all 00h | 2 |
| 16 | BCA descriptor | 1 |
| 17 | maxium transfer rate of application | 1 |
| 18 to 23 | Reserved = all 00h | 6 |
| 24 to 31 | Data zone allocation | 8 |
| 32 to 111 | Reserved = all 00h | 13 |

*where information on respective CPI positions is written*

FIG. 7

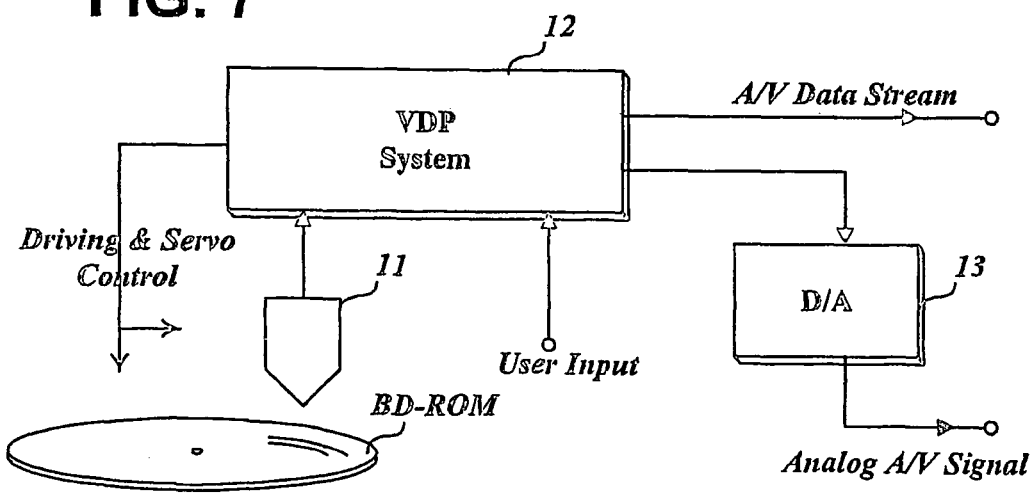

METHOD OF MANAGING COPY PROTECTION INFORMATION OF A RECORDING MEDIUM, RECORDING MEDIUM WITH COPY PROTECTION INFORMATION FOR CONTENTS RECORDED THEREON, AND REPRODUCING METHOD FOR THE RECORDING MEDIUM

PRIORITY INFORMATION

This application is a divisional of co-pending U.S. application Ser. No. 10/516,910, filed on May 9, 2005, the entire contents of which are hereby incorporated by reference and for which priority is claimed under 35 U.S.C. §120. application Ser. No. 10/516,910 is the national phase of International Application No. PCT/KR04/00113 filed on Jan. 24, 2004 under 35 U.S.C. §371. The entire contents of each of the above-identified applications are hereby incorporated by reference. This application also claims priority of Application No. 10-2003-0004930 filed in Korea on Jan. 24, 2003 under 35 U.S.C. §119.

1. TECHNICAL FIELD

The present invention relates to a method of managing copy protection information (CPI) for preventing an illegal copying of encrypted contents recorded on a high-density recording medium such as a BD-ROM (Blu-ray Disc ROM), a recording medium having the copy protection information stored thereon, and a method of reproducing the recording medium.

2. BACKGROUND ART

The standardization of new high-density optical disks capable of recording large amounts of high-quality video and audio data has been progressing rapidly and new optical disk related products are expected to be commercially available on the market in the near future. The Blu-ray Disc Rewritable (called 'BD-RE' in general) is one example of these new optical disks.

As shown in FIG. 1, a BD-RE disk comprises a clamping area, a transition, area, a burst cutting area (BCA), a lead-in area, a data area, and a lead-out area in order starting from the innermost circumference.

The lead-in area comprises several pre-assigned areas such as a first guard (Guard 1) area, a permanent information & control data (PIC) area, a second guard (Guard 2) area, a second information (Info 2) area, and an optimum power calibration (OPC) area. The Guard 1 area and the PIC area are pre-recorded areas in which some initial data is pre-recorded, whereas the other areas of the lead-in area, the data area, and the lead-out areas are all rewritable areas.

In the PIC area, important information about the disk, which is to be preserved permanently, is encoded in a wobbled groove by high frequency modulation (HFM). As shown in FIG. 2, the wobble-shaped data encoding is performed by bi-phase modulation.

In the mean time, the development of the read-only Blu-ray disk (BD-ROM) is also under way along with the development of the BD-RE. A BD-ROM disk comprises an inner area, a clamping area, a transition area, an information area, and a rim area, as shown in FIG. 3.

The contents of A/V streams are recorded in the data zone belonging to the information area in an encrypted manner using the copy protection information (CPI) with a view to preventing an illegal copying of the contents.

Disc information (DI) such as disc type is recorded in the PIC area belonging to the information area. In the case where the main data recorded in the data zone is encrypted, copy protection information (CPI) for decrypting the encrypted data is also recorded in the PIC area.

When an optical disk (a BD-ROM disk) is loaded into an optical disk reproducing apparatus, the optical disk reproducing apparatus first detects the copy protection information (CPI) recorded in the PIC area and then decrypts the main data recorded in the data zone using the copy protection information (CPI) if the main data is encrypted.

If an error occurs when the apparatus detects the copy protection information (CPI), which is required to decrypt the encrypted data, the contents of the BD-ROM disk cannot be decoded even if there in no data read error.

3. DISCLOSURE OF THE INVENTION

It is one object of the invention to provide a method of recording copy protection information on a recording medium that allows reliable read-out of the copy protection information for decrypting contents recorded on thereon.

It is another object of the present invention to provide a recoding medium having copy protection information for decrypting encrypted contents recorded thereon.

It is still another object of the present invention to provide a method of reproducing and decrypting encrypted contents recorded on a recording medium by using copy protection information recorded thereon.

A method of recording copy protection information on a recording medium in accordance with the present invention comprises recording encrypted data on the recording medium, and recording the copy protection information required for decrypting the encrypted data in a predetermined first area and additionally in an area other than the first area at least once.

A recording medium in accordance with the present invention comprises a data area storing encrypted data, a first area storing copy protection information required for decrypting the encrypted data, and at least one second area storing a duplicate of the copy protection information.

A method of reproducing a recording medium by a disk reproducing apparatus in accordance with the present invention comprises the steps of (a) driving the recording medium storing encrypted data, (b) detecting copy protection information, which is required for decrypting the encrypted data, recorded in a first area of the recording medium, and (c) if an error occurs in the detection of the copy protection information, detecting duplicated copy protection information from an area other than the first area and decrypting the encrypted data using the detected copy protection information.

The method of recording and reproducing the copy protection information of a recording medium in accordance with the present invention allows encrypted data recorded on the recording medium to be reproduced normally even when the copy protection information cannot be read from the PIC area in which the copy protection information is supposed to be recorded, due to scratches, finger prints, etc.

4. BRIEF DESCRIPTION OF THE DRAWINGS

In the drawings:

FIG. 1 illustrates the structure of a BD-RE disk;

FIG. 2 illustrates a high-frequency modulated (HFM) groove formed in the PIC area of the BD-RE disk;

FIG. 6 illustrates the structure of the disk information table including a duplicate of the copy protection information (CPI) in accordance with the present invention;

FIG. 7 illustrates a brief block diagram of an optical disk reproducing apparatus in which the present invention may be advantageously embodied.

5. DESCRIPTION OF THE PREFERRED EMBODIMENTS

In order that the invention may be fully understood, preferred embodiments thereof will now be described with reference to the accompanying drawings.

Figure 3:
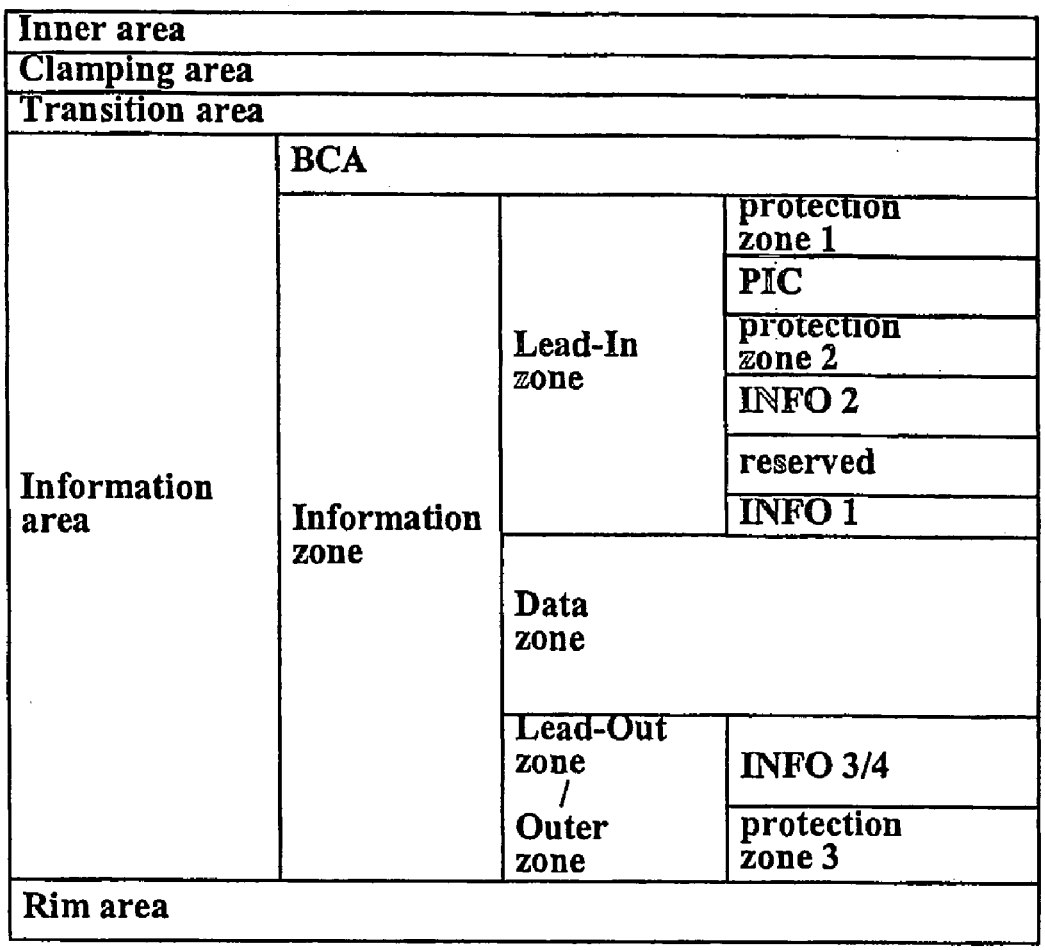
FIG. 3 illustrates areas assigned in a BD-ROM disk.

A BD-ROM disk in accordance with the invention has a disk structure comprising an inner area, a clamping area, a transition area, an information area, and a rim area, as shown in FIG. 3.

Figure 4:
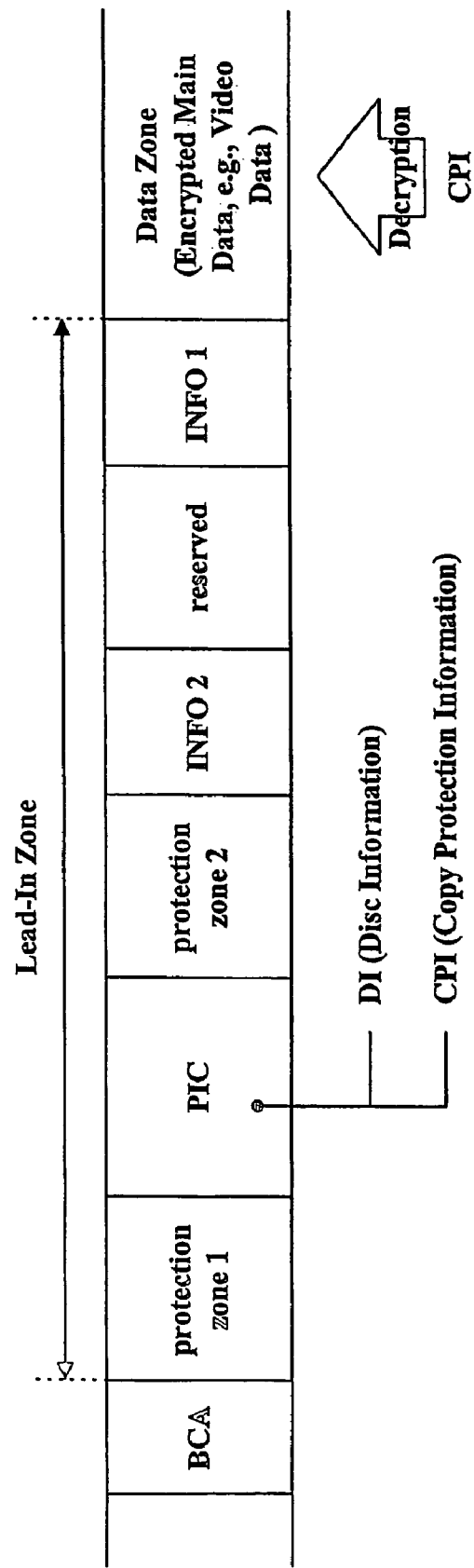
FIG. 4 illustrates disk information (DI) and copy protection information (CPI) recorded in the PIC area of the BD-ROM disk.

As shown in FIG. 4, the data zone assigned in the information area stores video data such as movies. The PIC area stores the disk information, which is general information about the disk, and the copy protection information (CPI), which is required to decrypt contents recorded in the data zone in an encrypted manner. In case of a BD-ROM disk, the data recording is conducted by forming pre-pits on the surface of the BD-ROM disk.

The disk information and CPI stored in the PIC area is recorded as straight pits, or wobbled pits, or partly as wobbled pits and partly as straight pits.

The CPI stored in the PIC area, which is a key value used to encrypt the main data recorded in the data zone, is duplicated at least once in areas other than the PIC area.

Figure 5:
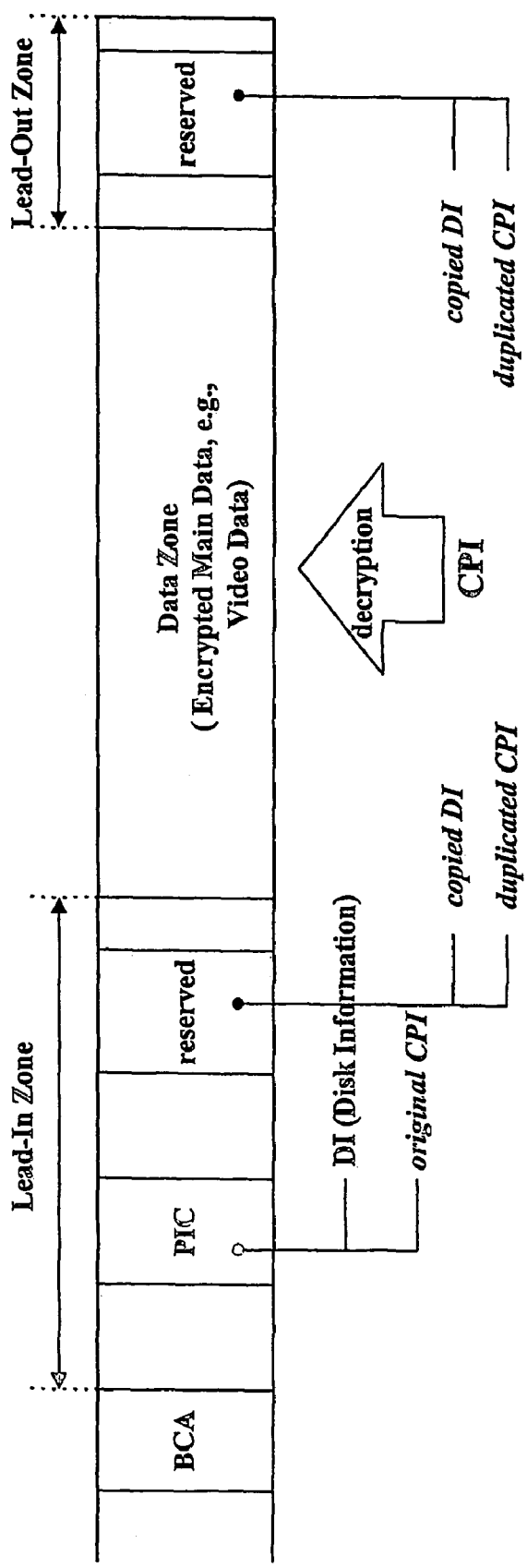
FIG. 5 shows an example in which the copy protection information (CPI) is written more than twice in accordance with the present invention.

FIG. 5 shows an example in which the CPI is written additionally in areas other than the PIC area.

In FIG. 5, the duplicated CPI is found in a reserved area of the lead-in area and in a reserved area of the lead-out area. In FIG. 5, the disk information as well as the CPI is duplicated in these areas.

The CPI may be duplicated at least once only in the lead-in area, at least once only in the lead-out area, or at least once both in the lead-in area and in the lead-out area.

The areas on a BD-ROM in which the CPI is to be duplicated may be specified by the BD-ROM standard or may vary depending on manufacturers. In the latter case, information on the position of each duplicated CPI is included in the disk information table.

FIG. 6 shows the structure of the disk information table in accordance with the present invention. The disk information table includes various types of information on the disk, including a disk information identifier, disk size/version, and disk structure. In addition, the disk information table includes information on respective duplicated CPI positions (CPI_position) in a reserved field.

The size of the position information (CPI_position) is proportional to the number of the duplicated CPIs. If information on the position of each duplicated CPI is assigned 4 bytes and there are N duplicated CPIs, the size of the position information (CPI_position) is 4×N bytes.

In the case where the disk information is duplicated along with the CPI in the lead-in area and/or lead-out area, the information on the respective CPI positions is also duplicated.

Figure 8:
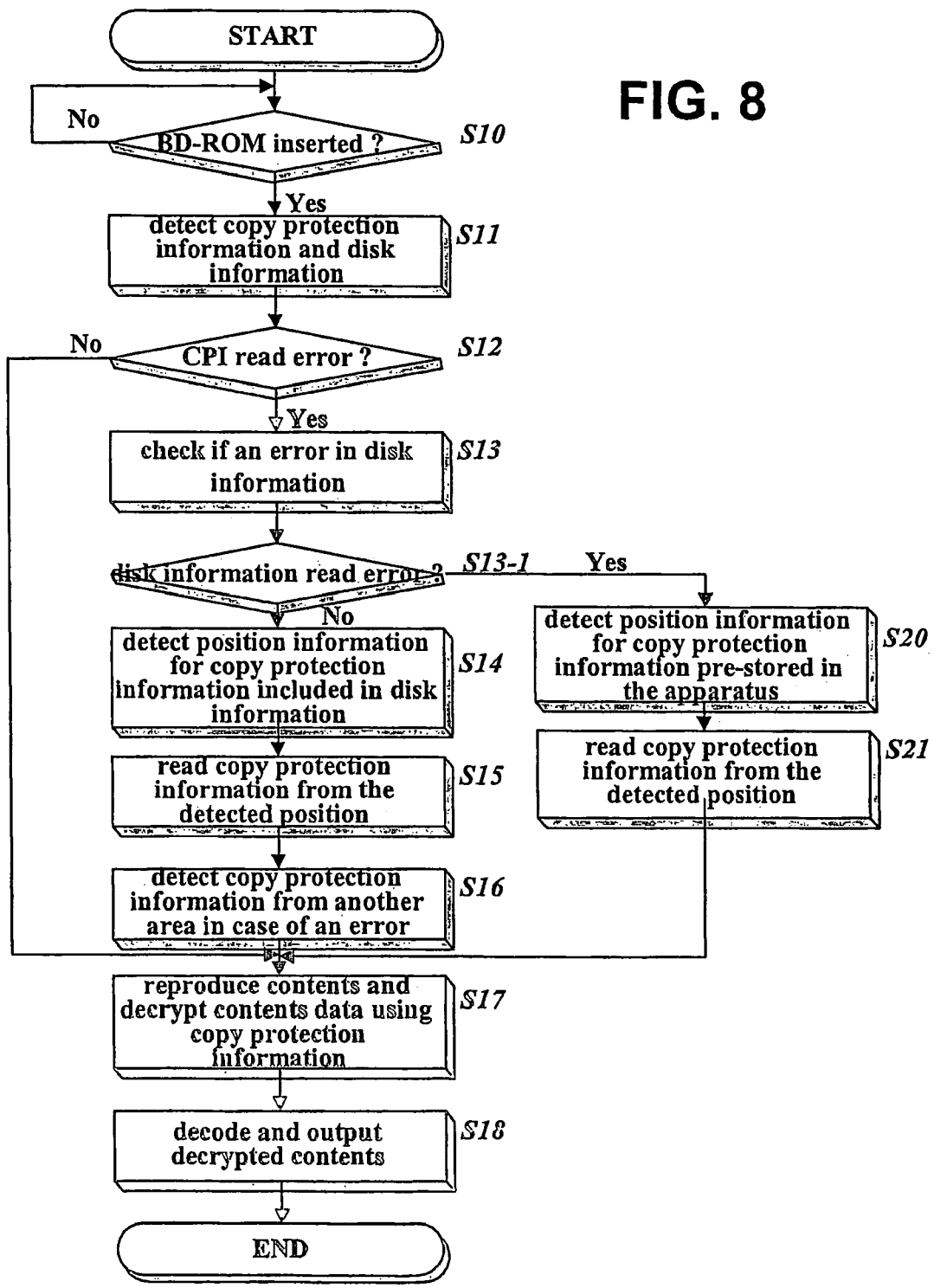
FIG. 8 illustrates an embodiment of a method of reproducing a recording medium in accordance with the present invention.

FIG. 7 illustrates a brief block diagram of an optical disk reproducing apparatus in which the present invention may be advantageously embodied. The apparatus, which comprises an optical pickup 11 for reading optical information from a BD-ROM disk, a VDP (video disc play) system 12 for signal processing and servo control, and a D/A converter 13, decrypts the contents recorded on the BD-ROM disk using the copy protection information and outputs A/V signals by following a procedure illustrated in FIG. 8.

If a BD-ROM disk having copy protection information stored thereon is inserted into the apparatus (S10), the VDP system 12 rotates the BD-ROM and controls the optical pickup 11 to search the PIC area of the BD-ROM for the CPI and disk information (S11)

If an error occurs when reading the CPI (S12), the VDP system 12 checks if there is an error in the disk information (S13). If no error is found (S13-1), the VDP system 12 reads information on duplicated CPI positions (CPI_position) recorded in the disk information (S14) and then reads the CPI by moving the optical pickup 11 to a position where a duplicated CPI is written (S15). If a read error occurs again, the VDP system 12 moves the optical pickup 11 to a next position where a duplicated CPI is written and reads the CPI recorded therein (S16).

If the disk information read from the PIC area has an error (S13-1), the optical disk reproducing apparatus reads information on the position of CPI and/or disk information stored in a predetermined position of the apparatus (S20) and reads the CPI by moving the optical pickup 11 to the position (S21).

If the CPI is detected normally, the VDP system 12 moves the optical pickup 11 to the data zone from which to begin reproducing encrypted contents and decrypts the reproduced contents using the CPI (S17). And the VDP system 12 decodes the decrypted contents and finally outputs A/V signals (S18).

The described method of recording and reproducing the copy protection information for a recording medium allows encrypted data recorded on the recording medium to be reproduced normally even when the copy protection information cannot be read from the PIC area due to scratches, finger prints, etc.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

The invention claimed is:

1. A method of recording data on a recording medium, comprising:
    generating a control information unit to control a recording or reproducing of data;
    recording the control information unit at a specific area in a lead-in area or a lead-out area of the recording medium; and
    recording copy-protected data in a main data area of the recording medium,
    recording copy protection information, duplicated from original copy protection information pre-recorded in the recording medium, in a first area formed in the lead-in area, the lead-out area or both the lead-in area and the lead-out area, wherein the first area is separated from the main data area, and the copy protection information is required for generating and/or processing the copy protected data, wherein the control information unit includes an identifier to indicate a position of the copy protection information.

2. The method of claim 1, wherein the step of recording copy protection information records the duplicated copy protection information in a zone other than the specific area within the lead-in area where the control information unit is recorded.

3. The method of claim 1, wherein the copy protection information includes a key value required for generating/processing the copy-protected data.

4. The method of claim 1, wherein the recording medium is an optical disc, the step of generating generates the control information unit including a disc information containing at least disc type information, disc size information, disc structure information, and data zone allocation information.

5. The method of claim 4, wherein the step of generating generates the control information unit copied from original control information unit pre-recorded in the recording medium.

6. A recording medium, comprising:
a control data area for recording a control information unit to control a recording or reproducing of data, the control data area being formed in a lead-in area or a lead-out area defined in the recording medium;
a first area for recording copy protection information duplicated from original copy protection information pre-recorded in the recording medium, the copy protection information being required for generating and/or processing copy-protected data, the first area being formed in the lead-in area, the lead-out area or both the lead-in area and the lead-out area; and
a main data area where data is recorded or to be recorded,
wherein the control information unit includes an identifier to indicate a position of the copy protection information, and the first area is formed in a zone other than the control data area where the control information unit is recorded.

7. The recording medium of claim 6, wherein the main data area includes the copy-protected data generated by the copy protection information.

8. The recording medium of claim 6, wherein the recording medium is an optical disc, the control information unit includes a disc information containing at least disc type information, disc size information, disc structure information, and data zone allocation information.

9. The recording medium of claim 8, wherein the control information unit is information unit copied from original control information unit pre-recorded in the recording medium.

10. The recording medium of claim 6, wherein the copy protection information includes a key value required for generating/processing the copy-protected data.

11. The recording medium of claim 10, wherein the key value is recorded in wobbled form and/or straight pre-pit form.

12. An apparatus for reproducing a recording medium, comprising:
a pickup unit configured to read data from the recording medium; and
a controller configured to control the pickup unit to detect a control information unit to control a reproducing of data and copy protection information required for processing copy-protected data and configured to control a reproducing of the copy protected data based on the control information unit and the copy protection information,
wherein the copy protection information is information duplicated from original copy protection information pre-recorded in the recording medium,
wherein the controller is configured to identify a position of the copy protection information from an identifier included in the control information unit, and control the pickup unit to detect the original copy protection information or the duplicated copy protection information according to the identified position,
wherein the control information unit is formed at a specific area in a lead-in area or a lead-out area of the recording medium, and the controller is configured to control the pickup unit to detect the duplicated copy protection information from a zone formed in the lead-in area, the lead-out area or both the lead-in area and the lead-out area.

13. The apparatus of claim 12, wherein the controller is configured to control the pickup unit to detect the duplicated copy protection information based on the identified position if the detection of the original copy protection information fails.

14. The apparatus of claim 12, wherein the recording medium is an optical disc, and the control information unit includes disc information containing at least disc type information, disc size information, disc structure information, and data zone allocation information.

15. The apparatus of claim 12, wherein the copy protection information includes a key required for processing the copy-protected data, and the controller is configured to control a decryption of the copy-protected data using the key.

16. The apparatus of claim 12, wherein the control information unit is an information unit copied from an original control information unit pre-recorded in the recording medium, and the controller is configured to identify a position of the duplicated copy protection information from the original control information unit or the copied control information unit.

* * * * *